United States Patent
Spratt

[11] 3,934,251
[45] Jan. 20, 1976

[54] AUTOMATIC $T_0$ CONTROL FOR USE IN AIRBORNE DME SYSTEM

[75] Inventor: Brendan J. Spratt, Boca Raton, Fla.

[73] Assignee: The Bendix Corporation, Southfield, Mich.

[22] Filed: Nov. 7, 1974

[21] Appl. No.: 521,593

[52] U.S. Cl.................. 343/6.5 R; 343/7 A; 343/7.3
[51] Int. Cl.[2]............................................ G01S 9/56
[58] Field of Search.................. 343/6.5 R, 7 A, 7.3

[56] References Cited
UNITED STATES PATENTS

| | | | |
|---|---|---|---|
| 3,631,487 | 12/1971 | Huntsinger............................ | 343/7.3 |
| 3,780,370 | 12/1973 | Reeves............................ | 343/6.5 RX |

Primary Examiner—T. H. Tubbesing
Attorney, Agent, or Firm—W. G. Christoforo; Bruce L. Lamb

[57] ABSTRACT

In distance measuring equipment (DME) for use in aircraft an interrogation is transmitted from a local airborne DME, generally to a ground station. The transmitted signal is also sampled and transformed by a local oscillator means to the frequency of the expected response and applied to the front end of the DME receiver. The sampled and transformed signal thereafter traverses the receiver circuits and is applied to start a range clock at the rear end of the receiver. Simultaneously, the signal traversing the receiver circuits is sampled and memorized in a sample and hold circuit. A response to the interrogation, when received, is also applied to the front end of the receiver and traverses the receiver circuits and applied to stop the range clock, the resulting change of state of the range clock being related to the range between the interrogating and responding stations. The response signal traversing the receiver circuits is sampled and memorized in a second sample and hold circuit, with the contents of both sample and hold circuits being compared against one another. The results of the comparison are applied to the local oscillator means to control the amplitude of the output signal thereof.

14 Claims, 2 Drawing Figures

AUTOMATIC $T_0$ CONTROL FOR USE IN AIRBORNE DME SYSTEM

BACKGROUND OF THE INVENTION

This invention relates to distance measuring equipment for use on aircraft and more particularly to means for starting and stopping the range clock of such equipment in response to an interrogation and subsequent response thereto so as to compensate for certain errors or uncertainties.

In a round trip ranging means such as the DME an interrogation is made by an interrogating station or interrogator at a time defined as $t_0$. A remote station responds to the interrogation and transmits a response. The time interval between $t_0$ and the arrival of the response at the interrogator is a measure of the distance or range from the interrogator to the remote station. Various elements of the interrogator or uncertainties associated with the interrogator can cause range errors. For example, range error can arise from filter time delay, amplifier propagation delay, detection, thresholding quantization, modulation and transmitter characteristics, etc. These range errors are normally present in or introduced by the receiver section of the normally airborne interrogator. One object of the present invention is to provide a highly accurate range measurement by eliminating, compensating for or calibrating to attenuate various of the range errors.

In conventional DME interrogating equipment the transmitter section of the equipment operates at a frequency which is different than the frequency at which the receiver operates. This eliminates interaction between the transmitter and the receiver and allows means for distinguishing between interrogations and responses thereto. The range clock is generally the last element at the back end of the receiver. Upon transmission of an interrogation by the interrogator a signal is applied directly from the transmitter section to start the clock. Then, of course, upon receipt of a response, the response is processed and decoded by the receiver section and applied to stop the range clock.

In addition, conventional interrogating equipment, of course, includes threshold circuits at the input of the range clock, with these thresholds to be exceeded before the range clock can be activated or stopped as the case may be. It is also well known to those skilled in the art that a response to a DME interrogation is subject to various causes of distortion, such as multipath distortion. This distortion is particularly severe and of concern at the leading edge of the response, and particularly at the back end of the leading edge. It is thus advantageous that the threshold be set as low as practical so as to respond to that portion of the leading edge which is least distorted. However, the slope of the leading edge of a received signal will vary as the signal strength varies. Specifically, a low strength received signal will be detected much later by a low level threshold than a high strength received signal would otherwise have been detected. The strength of received signals is affected by various factors such as range between stations and weather conditions.

SUMMARY OF THE INVENTION

In the present invention, an interrogation is transmitted as in the prior art. However, a sample of the interrogation as transmitted is not applied directly from the transmitter to start the clock. Instead, the transmission is sampled, suitably close to the circulator, with the sample being transformed, by mixing with a local frequency, to the receiver RF frequency and fed directly into the front end of the receiver. There is thus present at the front end of the receiver, simultaneously with the transmission, a signal herein termed the $t_0$ signal, which closely approximates the expected received response to that signal. Since the range clock is located at the back end of the receiver, the sampled interrogation must pass through the entire receiver before the range clock is started. Thereafter, when the actual response is received it also passes through the same receiver circuits before it will start the range clock. Since the signal corresponding to the interrogation and the response thereto must pass through the same receiver circuits, any errors associated with these circuits will affect both signals equally and thus the starting and stopping of the range clock will be compensated therefor.

It is known that the factors which affect the strength of received signals generally change relatively slowly with respect to the interrogation repetition frequency so that consecutively received signals will be generally at the same signal strength. Taking advantage of this fact, automatic threshold compensation is provided by sample and hold circuits, one of which samples and memorizes the amplitude of the $t_0$ signal propagating in the receiver, and the second of which samples and memorizes the amplitude of the response signal propagating in the receiver. The amplitudes of the signals memorized in the sample and hold circuits are compared, and if different, the amplitude of the $t_0$ signal is changed to be equal to the expected amplitude of the subsequent response signal. Thereafter, both the $t_0$ signal and the response signal will be detected at approximately the same point on their leading edge thus eliminating the error associated with the detection of signals of varying strength by the same low level threshold.

DESCRIPTION OF THE PREFERRED EMBODIMENT

Figure 1:
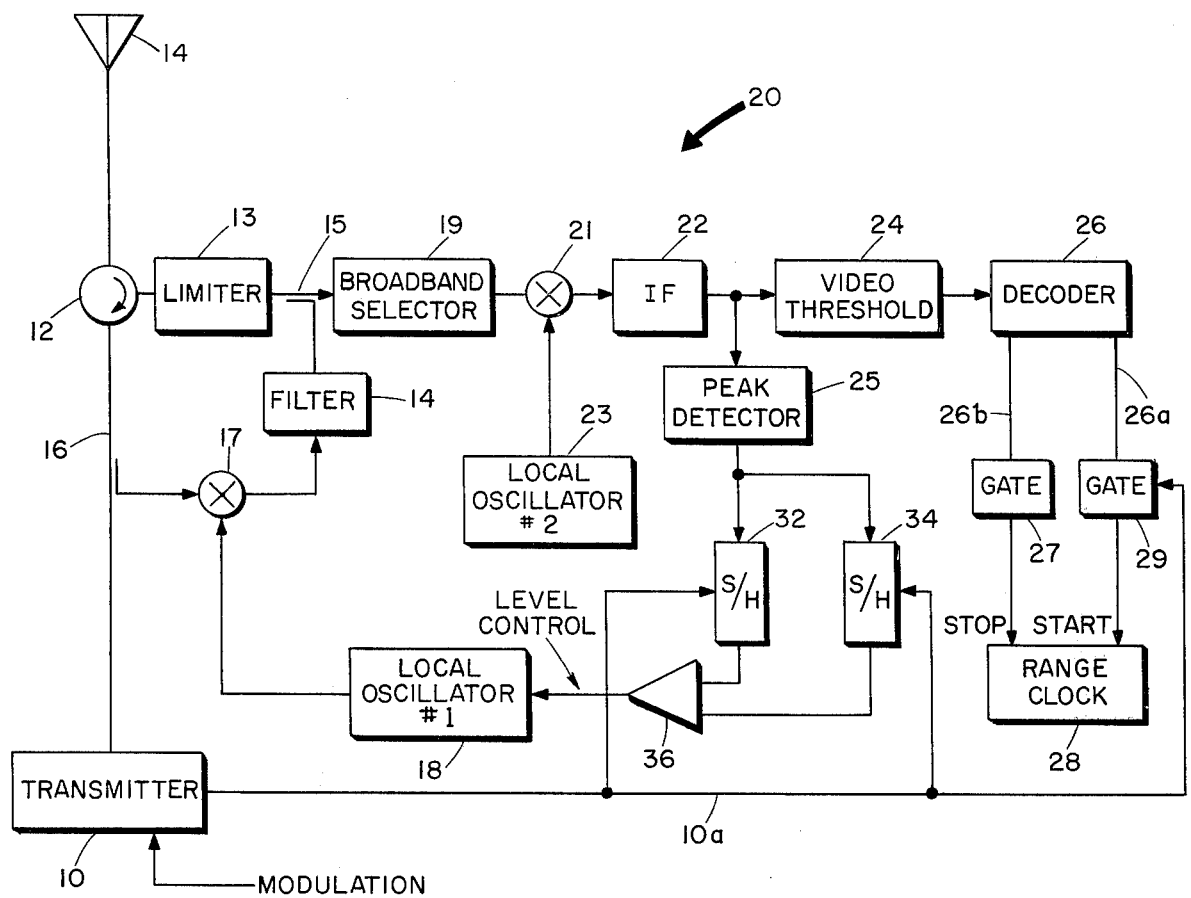
FIG. 1 is a simplified block diagram of a DME interrogating station which includes the improvement of the present invention.

Refer to FIG. 1 which generally shows a block diagram of airborne DME wherein a transmitter 10 is modulated to transmit an interrogation, generally in the form of a pulse pair, which proceeds through circulator 12 for radiation by antenna 14. Means by which this transmission is affected and the exact form of the coded signal transmitted are well known to those skilled in the art and will not comprise a part of this invention. Briefly, the interrogation signal normally comprises a coded pulse pair which the ground station recognizes as an interrogation. A probe 16 samples the interrogation suitably close to circulator 12, and applies the sampled signal to a mixer 17 and filter 14 of a local oscillator means, which also includes a local oscillator 18, wherein the sampled frequency is transformed to a signal frequency corresponding to the frequency of the expected response. The frequency of the transformed signals is thus, of course, at the receiver RF frequency. The resulting signal is injected into the front end or RF section of the receiver 20 which comprises a portion of the airborne DME. In this particular embodiment, the frequency signal from mixer 17 is injected by probe 15 into the RF section between limiter 13 and broadband selector 19. In any event, it should be understood that the injected signal, being of the same frequency as an expected response, can be injected at any suitable point in the RF section and suitably as close to the antenna as possible. The injected signal is generally designated the $t_0$ signal.

It should also be understood that if the $t_0$ signal is to be injected into a different receiver section, such as the IF section, then the output frequency of local oscillator 18 must be changed accordingly. Of course, in this case the injected signal may traverse fewer elements of the receiver with the result that compensation for receiver signal transit anomalies is not as satisfactory than if the injected signal is injected at the RF frequency into the receiver RF section.

The $t_0$ signal is mixed with the regular receiver local frequency from local oscillator 23 in mixer 21 to obtain the receiver intermediate frequency. The resulting IF signal is amplified and detected by IF section 22 and video threshold 24. IF and video processing circuits as used in DME are well known in the art and their description need not be repeated here.

The pulses from video section 24 are applied to a decoder 26 which is suitably a digital type decoder but which can alternately be any type pulse decoder such as a delay line decoder. It should be understood that decoder 26 has the capability of recognizing either the interrogation pulse pair or the response pulse code, which is in current practice also a pulse pair whose spacing differs from the spacing of the interrogation pulse pair. Upon decoding an interrogation pulse pair, decoder 26 generates an output signal on line 26a which passes through gate 29, which is opened by a signal from transmitter 10 on line 10a which is generated for a short time period immediately subsequent to an interrogation. The signal on line 26a suitably starts range clock or counter 28 from an initial state. Suitably, a range clock will comprise a binary counter and a source of clock pulses, as known to those skilled in the art. Alternately, the range counter or clock can comprise any other suitable time recording means.

Thereafter, the response of the ground station to the interrogation is received at antenna 14 and applied through circulator 12 to the front end of receiver 20. This response now traverses the receiver, generally through the same circuits through which the $t_0$ signal traversed and, as previously explained, is applied to decoder 26. The decoder, upon recognizing the response pulse code, generates a signal at line 26b which is applied through the standard system range or tracking gate 27 to stop range counter 28. The range may now be read from range counter 28 by any means known to those skilled in the art including those means that are now conventional in the art, the exact means not being a portion of this invention.

Figure 2:
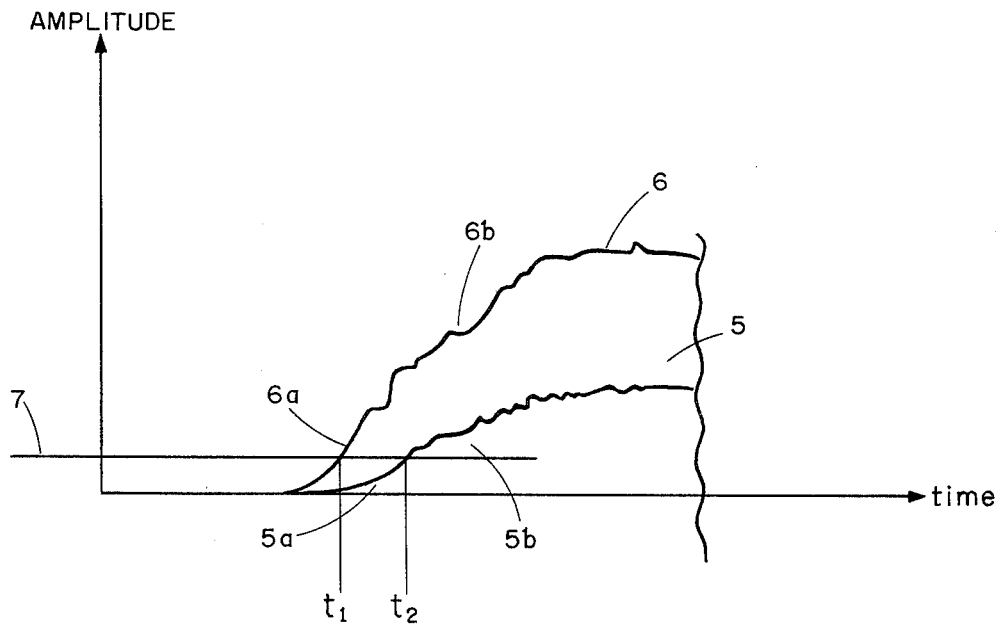
FIG. 2 illustrates signals of varying strength compared against a constant low level threshold and is helpful in explaining the utility of the invention.

As previously mentioned, automatic threshold compensation is provided by two sample and hold circuits, here embodied as sample and hold circuits 32 and 34. The need for threshold compensation can best be explained with respect to FIG. 2 where the leading edge of a relatively low strength signal 5 is shown on common coordinates with the leading edge of a relatively high strength signal 6. It should be understood that the signal representations are simplified for clarity. It is known that signals transmitted through a radio link from a remote station to a local station and subject to multipath phenomena are received at the local station generally by line of sight transmission and also through multipath or reflected transmissions wherein the effective distance traveled by the signal is somewhat greater than by line of sight transmission. Thus, any distortion introduced by multipath will occur somewhat later than that portion of the signal which is received by line of sight transmission. Thus, the initial portion of the leading edge, for example portion 6a with respect to signal 6 and portion 5a with respect to signal 5, will be a relatively clean form with the latter portion of the leading edge, portions 5b and 6b, respectively, will be distorted because of multipath interference. It is thus desirable for extreme accuracy in determining the time of arrival of a signal at a local station that the detection threshold be as low as practically feasible. A threshold level is illustrated by horizontal line 7. However, as is also commonly known, a high strength signal such as signal 6 will have a leading edge form that differs quite markedly from that of a low strength signal received from the same remote station, as illustrated by signal 5. Thus, assuming a common threshold of both the high strength signal and the low strength signal, the high strength signal will be detected relatively earlier, for example at time $t_1$, while the low strength signal will be detected relatively later, for example at $t_2$. In the present invention, one of the pulses of FIG. 2 corresponds to the $t_0$ signal injected to start the range clock while the other pulse corresponds to the received response. Automatic threshold compensation adjusts the pulse which corresponds to the injected $t_0$ signal to be generally similar to the pulse corresponding to the received response so that $t_1$ and $t_2$ closely overlap.

Referring again to FIG. 1, automatic threshold compensation is accomplished as follows. At the time an interrogation is transmitted the signal on line 10a from transmitter 10 is also applied to sample and hold circuits 32 and 34. One sample and hold circuit, for example circuit 32, in response thereto is conditioned to sample, through peak detector 25, the peak value of the video signal at the input terminal of video threshold 24. The sampled signal corresponds to the video content of the injected $t_0$ signal. Thereafter, sample and hold circuit 32 is disconnected from the threshold input terminal and sample and hold circuit 34 connected thereto, in response to a change in the signal from transmitter 10. A pulse corresponding to a received response is then entered into sample and hold circuit 34 and compared against the contents of sample and hold circuit 32 in comparator 36 which acts to adjust the output level of local oscillator 18 to control the amplitude or strength of the injected $t_0$ signal so that the corresponding pulses at the threshold input terminal will be similar to the pulses corresponding to the receiver response at the same input terminal. Local oscillator 18 can comprise an oscillator feeding its output through a standard commercially available buffer amplifier, whose gain is controllable by the signal from comparator 36, to mixer 17.

Peak detector 25 and sample and hold circuits 32 and 34 can be any of like circuits known to those in the art. For example, a sample and hold circuit can be comprised of a unity operational amplifier feeding a capacitor across which a voltage corresponding to the peak value of the sampled signal is impressed.

It is now obvious that any errors associated with the movement of signals through the receiver circuits have been compensated for and greatly attenuated by causing both the $t_0$ signal which starts the range counter and the response which stops the range counter to traverse the same circuits. In addition, certain threshold errors have been eliminated or greatly reduced.

Although only one embodiment of the invention has been shown, alterations and modifications should now be obvious to one skilled in the art. For example, alternate means of controlling the timing of the sample and hold circuit is available to the skilled technician. In addition, it should also be noted that injection of the $t_0$ signal can be accomplished without automatic threshold compensation if so desired and if the resulting time errors can be accepted. Accordingly, the invention is to be limited only by the true scope and spirit of the appended claims.

The invention claimed is:

1. In distance measuring equipment which includes a transmitter and antenna for transmitting on a first frequency an interrogation message to a remote station and a receiver operating on a second frequency for receiving messages which comprise responses from the remote station, wherein the time difference between the time of transmission of an interrogation and the receipt of a response thereto is a measure of the range between the transmitting station and the responding station, an improvement comprising:
    means for sampling the transmitted message at a point relatively close to the antenna;
    local oscillator means including means responsive to the sampled signal for transforming the sampled signal to a frequency related to the frequency of the expected response;
    means for injecting the transformed signal into said receiver whereby the transformed signal will traverse through circuits of the receiver;
    decoding means responsive to the transformed signal traversing the receiver circuits for generating a first signal; and,
    processing means energized to a first state by said first signal, said processing means being subsequently energized to a second state by a second signal comprising a response from said remote station traversing the receiver circuits and decoded by said decoding means.

2. The distance measuring equipment of claim 1 wherein said processing means comprises timing means turned on by said first signal, said timing means being subsequently turned off by a response from said remote station traversing the receiver circuits and decoded by said decoding means, the change of state of said timing means from turn on to turn off being related to the range between the transmitting station and the responding station.

3. The distance measuring equipment of claim 1 wherein said interrogation message comprises a first pulse code and said response comprises a second pulse code, said decoding means comprising a pulse decoder responsive to said first pulse code for generating said first signal and responsive to said second pulse code for generating said second signal.

4. The distance measuring equipment of claim 3 wherein said first pulse code comprises a pulse pair having pulses separated by a first predetermined time interval and wherein said second pulse code comprises a second pulse pair having pulses separated by a second and different predetermined time interval.

5. The distance measuring equipment of claim 4 wherein said timing means comprises a binary counter and a source of clock pulses, said timing means being arranged to accumulate said clock pulses in said counter during the interval between said first and second signals.

6. The distance measuring equipment of claim 5 wherein said means for injecting comprises a probe connected to inject the transformed signal into the receiver RF section.

7. The distance measuring equipment of claim 1 wherein said processing means comprises a binary counter and source of clock pulses, said timing means being arranged to accumulate said clock pulses in said counter during the interval between said first and second signals.

8. The distance measuring equipment of claim 7 wherein said interrogation message comprises a first pulse code and said response comprises a second pulse code, said decoding means comprising a pulse decoder responsive to said first pulse code for generating said first signal and responsive to said second pulse code for generating said second signal.

9. The distance measuring equipment of claim 8 wherein said means for injecting comprises a probe connected to inject the transformed signal into the receiver RF section.

10. The distance measuring equipment of claim 1 wherein said means for injecting comprises a probe connected to inject the transformed signal into the receiver RF section.

11. The distance measuring equipment of claim 10 wherein said interrogation message comprises a first pulse code and said response comprises a second pulse code, said decoding means comprising a pulse decoder responsive to said first pulse code for generating said first signal and responsive to said second pulse code for generating said second signal.

12. The distance measuring equipment of claim 1 wherein said receiver includes a threshold circuit and with additionally means responsive to the injected transformed signal in the receiver circuits and the received response signal for adjusting the level of the injected signal.

13. The distance measuring equipment of claim 1 wherein said receiver includes a threshold circuit, the injected transformed signal and the received response signal being required to overcome the threshold circuit before they are effective to influence said processing means and with additionally:
    first memory means responsive to the transmission of an interrogation message for memorizing a third signal corresponding to the signal strength of the injected transformed signal in the receiver;
    second memory means responsive to a received response traversing the receiver circuits for memorizing a fourth signal corresponding to the signal strength of the received response in the receiver; and,
    means comparing the third signal with the fourth signal for adjusting the level of the injected signal.

14. In distance measuring equipment which includes a transmitter and antenna for transmitting on a first frequency an interrogation message to a remote station, and a receiver means operating on a second frequency for receiving messages which comprise responses from the remote station, wherein the time difference between the time of transmission of an interrogation and the receipt of a response thereto is a measure of the range between the transmitting station and the responding station, an improvement comprising:

means for injecting a first signal corresponding to a sample of the first frequency into said receiver means whereby the first signal will traverse through circuits of said receiver;

first memory means responsive to the transmission of an interrogation message for memorizing a second signal corresponding to the signal strength of the first signal in said receiver means;

second memory means responsive for memorizing a third signal corresponding to the signal strength of a response in said receiver means; and, means comparing the memorized second signal with the memorized third signal for adjusting the level of the injected first signal.

* * * * *